United States Patent [19]

Nakayama

[11] 3,769,165

[45] Oct. 30, 1973

[54] PROCESS FOR PRODUCING ADENOSINE TRIPHOSPHATE AND ADENOSINE DIPHOSPHATE

[75] Inventor: Kiyoshi Nakayama, Sagamihara-shi, Japan

[73] Assignee: Kyowa Hakko Kogyo Co., Ltd., Tokyo, Japan

[22] Filed: June 14, 1968

[21] Appl. No.: 736,986

Related U.S. Application Data

[63] Continuation of Ser. No. 682,654, Nov. 13, 1967, abandoned.

[52] U.S. Cl............................................. 195/28 N
[51] Int. Cl............................................. C12d 13/06
[58] Field of Search.................................. 195/28 N

[56] References Cited
UNITED STATES PATENTS

3,298,923   1/1967   Banno et al...................... 195/28 N
3,313,710   4/1967   Kinoshita et al.................. 195/28 N

FOREIGN PATENTS OR APPLICATIONS

675,023   11/1963   Canada............................. 195/28 N

Primary Examiner—Alvin E. Tanenholtz
Attorney—Craig, Antonelli, Stewart & Hill

[57] ABSTRACT

A process for producing adenosine triphosphate (ATP) and adenosine diphosphate (ADP) which comprises culturing a microorganism belonging to the genus Corynebacterium, Micrococcus or Arthrobacter in an aqueous nutrient medium containing adenine, a derivative of adenine, such as adenosine or adenylic acid, or a substance containing the same, accumulating ATP and ADP therein and recovering the products. The yield may be increased by including at least about 0.4 percent by weight of $PO_4$ as inorganic phosphate in the medium.

17 Claims, No Drawings

PROCESS FOR PRODUCING ADENOSINE TRIPHOSPHATE AND ADENOSINE DIPHOSPHATE

CROSS-REFERENCE TO RELATED APPLICATION

This application is a continuation application of co-pending application of U.S. Ser. No. 682,654 filed on Nov. 13, 1967 now abandoned.

This invention relates to a process for producing adenosine triphosphate and adenosine diphosphate. More particularly, it relates to a process for the production of adenosine triphosphate and adenosine diphosphate by fermentation. Even more particularly, the invention relates to a process for the production of adenosine triphosphate and adenosine diphosphate by fermentation with microorganisms in the presence of adenine or derivatives thereof.

Adenosine triphosphate (ATP) and adenosine dephosphate (ADP) are compounds known in the art which play an important role in metabolism in vivo. These compounds are also important as biochemical reagents and as high energy phosphoric acid addition agents, as well as in the field of medicine.

One of the objects of the present invention is to provide an improved process for the production of adenosine triphosphate and adenosine diphosphate which overcomes the disadvantages and deficiencies of the prior art methods.

Another object of the present invention is to provide a process for producing adenosine triphosphate and/or adenosine diphosphate by fermentation which may be carried out in an efficacious and simple manner.

A further object of the invention is to provide a process for producing adenosine triphosphate and adenosine diphosphate by fermentation which may be carried out advantageously on an industrial scale at low cost to give a high yield of product.

These and other objects and advantages of the present invention will become apparent to those skilled in the art from a consideration of the following specification and claims.

As the result of various researches on a process for producing ATP and ADP by means of microorganisms, the present inventor has found, in accordance with the present invention, that significant amounts of ATP and ADP are accumulated in the culture liquor when adenine or derivatives thereof, or natural substances containing the same, are added to a culture medium wherein fermentation is carried out with microorganisms for producing ATP and ADP.

Microorganisms to be employed in the process of the present invention are bacteria belonging to the gernea Corynebacterium, Micrococcus and Arthrobacter. Included are microorganisms which themselves produce adenine or derivatives thereof.

The gist of the present invention is the addition of adenine to the culture medium during fermentation. Suitable derivatives thereof, such as adenosine, adenylic acid and the like, may also be employed with effectiveness. It is also possible to use natural substances containing adenine or its derivatives, as these too in effect give the same result.

Either a synthetic culture medium or a natural nutrient medium is suitable in the present invention as long as it contains the essential nutrients for the growth of the strain employed. Such nutients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as glycerol, mannitol, sorbitol, organic acids, etc. These substances may be used either as a sole source of carbon or in mixtures of two or more. As a nitrogen source, various kinds of inorganic or organic salts or compounds, such as urea or ammonium salts such as ammonium chloride, ammonium nitrate, ammonium sulfate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. The source of nitrogen may also be a single substance or a combination of two or more nitrogen-containing materials. Inorganic compounds which may be added to the culture medium include magnesium sulfate, sodium phosphate, potassium di-hydrogen phosphate, potassium monohydrogen phosphate, iron sulfate, manganese chloride, calcium chloride, etc.

When using mutant strains whcih have particular nutritional requirements, the substances necessary to satisfy these requirements of growth should, of course, be added to the culture medium. Moreover, it has been observed that the addition of amino acids or vitamins, for example, biotin, thiamine, pantothenic acid or compounds having a physiological significance identical to such compounds (such as, $\beta$ alanine or coenzyme A for pantothenic acid), shows the effects of stabilizing the growth of the microorganisms and the resultant fermentation as well as giving rise to a high yield of product.

If fermentation is conducted by adding adenine compounds to a culture medium as described above, ATP, ADP and adenylic acid (AMP) are produced individualy or together.

The amounts of ATP, ADP and AMP produced are increased by adding about 0.4 percent by weight or more of inorganic phosphate as $PO_4$ is preferred and gives a good effect.

The amount of adenine or derivative thereof to be added to the culture medium is optimally about 1 to 10 mg/ml of adenine or equivalent thereof. Glucose or other nutritional components may also be added to the medium during the course of fermentation.

Fermentation or culturing is conducted under aerobic conditions, such as aerobic shaking of the culture or with aeration and agitation of a submerged culture, at a temperature of about 20° to 40°C., and at a pH of about 5 to 9. Under these conditions, remarkably large amounts of ATP, ADP and AMP are produced after about 36 to 120 hours of culturing. The yield of ATP and ADP, especially of ATP, is greatly increased by adjusting the pH of the culture liquor so as to maintain the culture liquor after the addition of adenine or a derivative thereof to the culture medium at neutral or weakly acid (pH 7.5 to 5.5).

After the completion of culturing, the resultant ATP and ADP can be recovered from the fermentation liquor by conventional means, such as ion exchange resin treatment, extraction with solvents, precipitation, adsorption or the like.

The following examples are given merely as illustrative of the present invention and are not to be considered as limiting. Unless otherwise noted, the percentages therein and throughout the application are by weight.

EXAMPLE 1

Corynebacterium sp. 3485 ATCC 21084 is used as the seed bacterium. It is cultured in a culture medium consisting of 2 percent of glucose, 1 percent of peptone, 1 percent of yeast extract, 0.3 percent of NaCl and 30 $\mu/l$ of biotin at 30°C. for 24 hours.

The resultant seed culture is inoculated in the ratio of 10 percent (by volume) into a fermentation medium having the following composition:

100 g glucose
6 g urea
10 g KH$_2$HPO$_4$
10 g MgSO$_4$·7H$_2$O
10 g yeast extract
30 $\mu$ biotin
0.1 g CaCl$_2$·2H$_2$O The foregoing ingredients are dissolved in one liter of water to make the fermentation medium. After adjusting the pH thereof to 8.0 with NaOH, it is poured into individual flasks and sterilized at 1 kg/cm$^2$ for ten minutes in an autoclave.

Twenty ml. portions of the combination of seed and fermentation media are poured into individual 250 ml. conical flasks. Culturing is then carried out with aerobic shaking at 30°C.

After 72 hours of culturing, adenine is added to the fermentation medium to give a concentration of 2 mg/ml. Culturing is then subsequently continued for 24 hours. The pH of the culture medium is maintained at neutral or weakly acidic. At the completion of culturing, the pH of the medium is 5.8. As a result, 3.1 mg/ml. of ATP and 0.90 mg/ml. of ADP (each being measured as the free acid) are produced in the culture liquor.

The filtrate obtained by removing the bacterial cells from the fermentation liquor is passed through a strongly basic anion exchange resin column. Dowex (X2), of the chloride type. Respective fractions of ATP and ADP are obtained by eluting with hydrochloric acid. The fractions are neutralized with caustic soda (sodium hydroxide). Subsequently, they are treated with carbon powder, concentrated and cooled. This treatment results in crystals of the respective sodium salts of ATP and ADP.

EXAMPLE 2

Corynebacterium mycetoides KY 3536 ATCC 21134 is used as the seed bacterium. Culturing is carried out in the same manner as described in EXAMPLE 1. As a result, 1.5 mg/ml of ATP, 0.8 mg/ml of AMP are produced.

EXAMPLE 3

The same procedure as described in EXAMPLE 1 is carried out using Corynebacterium sp. 3485 ATCC 21084 as the seed bacterium, except that the concentration of glucose in the fermentation medium is 3 percent. AT the completion of fermentation, 0.4 mg/ml of ATP and 0.3 mg/ml of ADP are found to be produced in the culture liquor.

EXAMPLE 4

Micrococcus sodonensis ATCC 15932 is used as the seed bacterium. Culturing is carried out therewith in the same culture medium and under the same culturing conditions as described in EXAMPLE 1 for 72 hours. Thereafter, adenine is added to the fermentation liquor to give a concentration thereof of 2 mg/ml. Culturing is then continued for a further 24 hours. As a result, 1.3 mg/ml of ATP and 0.5 mg/ml of ADP (each being measured as the free acid) are produced. After the addition of adenine, the pH of the culture medium was maintained at neural or weakly acidic, and the pH was 6.0 at eh completion of culturing.

EXAMPLE 5

The same procedure as described in EXAMPLE 1 is conducted except that Micrococcus sodonensis ATCC 15932 is used as the seed bacterium and that the concentration of glucose in the fermentation medium is 3 percent. The amounts of ATP and ADP produced are 0.4 mg/ml and 0.3 mg/ml, respectively.

EXAMPLE 6

Arthrobacter sp. 3486 ATCC 21085 is employed as the seed bacterium. It is cultured in the same culture medium and under the same culturing conditons as described in Example 1 for 72 hours. Thereafter, adenine is added to the fermentation liquor to give a concentration of 2 mg/ml, and culturing is continued for another 24 hours. After the addition of the adenine, the pH of the culture medium is maintained at neutral or eaeakly acidic, and the pH is 5.8 at the completion of culturing. Producded in the culture liquor are 2.3 mg/ml of ATP and 0.6 mg/ml of ADP (each being measured as the free acid).

EXAMPLE 7

The same procedure as described in Example 1 is conducted except that Arthrobacter sp. 3486 ATCC 21085 is used as the seed bacterium and the concentration of glucose in the fermentation medium is 3 percent. The amounts of ATP and ADP produced are 0.8 mg/ml and 0.25 mg/ml, respectively.

The invention being thus described, it will be obvious that the same may be varied in many ways. Such variations are not to be regarded as a departure from the spirit and scope of the invention, and all such modifications are intended to be included within the scope of the following claims.

I claim:

1. A process for producing adenosine triphosphate and adenosine diphosphate which comprises culturing a micro-organism belonging to corynebacterium mycetoides under aerobic conditions in an aqueous nutrient medium containing an additive selected from the group consisting of adenine, derivatives of adenine and substances containing adenine or a derivative thereof, accumulating adenosine triphosphate and adenosine diphosphate in the resultant culture liquor, and recovering the same therefrom.

2. The process of claim 1, wherein said derivatives of adenine are selected from the group consisting of adenosine and adenylic acid.

3. The process of claim 1, wherein said additive is present in the nutrient medium at the initiation of culturing.

4. The process of claim 1, wherein said additive is added to the nutrient medium after the initiation of culturing.

5. The process of claim 1, wherein culturing is carried out at a temperature of from about 20° to 40°C. and at a pH of about 5 to 9.

6. The process of claim 1, wherein the nutrient medium contains at least about 0.4 percent by weight of $PO_4$ as inorganic phosphate.

7. The process of claim 1, wherein said additive is added to the medium in an amount to provide from about 1 to 10 mg/ml of adenine therein.

8. The process of claim 1, wherein the pH is maintained at between 5.5 and 7.5 after said additive is added to said medium.

9. The process of claim 1, wherein said nutrient medium contains glucose.

10. The process of claim 1, wherein said microorganism is corynebacterium mycetoides ATCC 21134.

11. A process for producing adenosine triphosphate and adenosine diphosphate which comprises culturing a micro-organism belonging to corynebacterium mycetoides under aerobic conditions at a temperature of from about 20° to 40°C. and at a pH of about 5 to 9 in an aqueous nutrient medium containing about 0.4 to 1.6 percent by weight of $PO_4$ as inorganic phosphate and an additive selected from the group consisting of adenine, derivatives of adenine and substances containing adenine or a derivative thereof, accumulating adenosine triphosphate and adenosine diphosphate in the resultant culture liquor, and recovering the same therefrom.

12. The process of claim 11, wherein said additive is added to the nutrient medium after the initiation of culturing.

13. The process of claim 12, wherein the pH is maintained at between 5.5 and 7.5 after said additive is added to said medium.

14. The process of claim 11, wherein said additive is added to the medium in an amount to provide from about 1 to 10 mg/ml of adenine therein.

15. The process of claim 11, wherein said microorganism is *Corynebacterium mycetoides* ATCC 21134.

16. The process of claim 11, wherein said derivatives of adenine are selected from the group consisting of adenosine and adenylic acid.

17. The process of claim 11, wherein said nutrient medium contains glucose.

* * * * *

UNITED STATES PATENT OFFICE
CERTIFICATE OF CORRECTION

Patent No. 3,769,165          Dated  October 30, 1973

Inventor(s)   Kiyoshi NAKAYAMA

It is certified that error appears in the above-identified patent and that said Letters Patent are hereby corrected as shown below:

Title page, insert the following:

[30]     Foreign Application Priority Data

November 17, 1966     Japan ... 75232/66

Signed and sealed this 8th day of October 1974.

(SEAL)
Attest:

McCOY M. GIBSON JR.                C. MARSHALL DANN
Attesting Officer                   Commissioner of Patents